United States Patent [19]

Mikeš et al.

[11] 4,097,420

[45] Jun. 27, 1978

[54] METHOD FOR PREPARATION OF MACROPOROUS AMPHOTERIC ION EXCHANGERS WITH HIGHLY CROSSLINKED HYDROPHILIC POLYMERIC MATRIX

[75] Inventors: Otakar Mikeš; Petr Štrop; Jiří Čoupek, all of Prague, Czechoslovakia

[73] Assignee: Ceskoslovenska akademie ved, Prague, Czechoslovakia

[21] Appl. No.: 548,095

[22] Filed: Feb. 7, 1975

[30] Foreign Application Priority Data

Feb. 12, 1974 Czechoslovakia ................ 978/74

[51] Int. Cl.$^2$ .................. C08F 2/18; B01D 15/08
[52] U.S. Cl. ................. 260/2.1 R; 260/79.3 M; 260/112 R; 260/112.5 R; 526/14; 526/46; 526/49; 526/27; 526/210; 526/213; 526/217
[58] Field of Search ....... 260/2.1 R, 2.1 M, 79.3 MU, 260/80.75, 80.81, 29.6 TA, 31.2 R, 33.4 R, 32.6 N, 79.3 M; 526/307, 14, 27, 49, 46, 210, 213, 217

[56] References Cited

U.S. PATENT DOCUMENTS

| | | | |
|---|---|---|---|
| Re. 26,934 | 8/1970 | Mosbach | 526/12 |
| 2,508,718 | 1/1945 | Jones | 526/307 |
| 3,083,118 | 3/1963 | Bridgeford | 260/2.1 E |
| 3,205,184 | 9/1965 | Hatch | 260/885 |
| 3,220,960 | 11/1965 | Wichterle | 260/29.6 E |
| 3,629,230 | 12/1971 | Soderquist | 260/2.1 R |
| 3,645,922 | 2/1972 | Weiss et al. | 260/2.1 E |
| 3,711,489 | 1/1973 | Brendley, Jr. | 260/79.3 MU |
| 3,784,540 | 1/1974 | Kliment | 260/80.81 |
| 3,875,085 | 4/1975 | Bolto | 260/2.1 R |
| 3,892,720 | 7/1975 | Johnke | 260/79.3 MU |
| 3,929,741 | 12/1975 | Laskey | 260/79.3 M |
| 3,959,236 | 5/1976 | Peska et al. | 260/79.3 M |

FOREIGN PATENT DOCUMENTS

| | | | |
|---|---|---|---|
| 659,606 | 3/1963 | Canada | 260/79.3 M |
| 1,197,323 | 7/1970 | United Kingdom. | |

*Primary Examiner*—Joseph L. Schofer
*Assistant Examiner*—Peter F. Kulkosky

[57] ABSTRACT

The invention relates to a method for preparation of hydrophilic macroporous ion exchangers of the amphoteric character which are suitable above all for isolation and separation of biological materials. The preparation consists in copolymerization of anionogenous monomers, as sulfoalkyl acrylates and methacrylates, sulfoalkylacrylamides, sulfoalkylmethacrylamides, acrylic and methacrylic acid, with cationogenous monomers, as aminoalkyl acrylates and methacrylates, aminoalkylacrylamides, aminoalkylmethacrylamides and their quaternary ammonium derivatives, and with crosslinking monomers, as alkylene or oligo and polyglycol diacrylates and dimethacrylates, bisacrylamides, bismethacrylamides and divinylbenzene, in the water dispersion system containing inert organic compounds, as alcohols, acids, amines or nitriles. Amphoteric ion exchangers are also prepared by sorption and neutralization of the macroporous hydrophilic cation exchangers with basic monomers, as vinylpyridines, aminoalkyl acrylates and methacrylates, aminoalkylacrylamides, aminoalkylmethacrylamides and their quaternary ammonium derivatives, and their subsequent copolymerization with the pendant double bonds of the cation exchangers. An analogous procedure was performed with macroporous hydrophilic anion exchangers and the acidic monomers, as sulfoalkyl acrylates and methacrylates, sulfoalkylacrylamides, sulfoalkylmethacrylamides, acrylic and methacrylic acid. Another methods for preparation of amphoteric ion exchangers consists in modification of hydroxyl groups of crosslinked acrylate, methacrylate, acrylamide and methacrylamide copolymers by parallel reactions with anionogenous and cationogenous compounds, as halogenoalkylamines, their ammonium compounds and halogenoalkane acids or in the reaction of these copolymers first with a compound containing several reactive groups in its molecule, as phosgene, epichlorohydrine, di- and polyepoxide, di- and polyisocyanate, and then with compounds rendering anions and cations or dipolar ions by dissociation, as diamines, aminoacids, hydroxyacids, and dicarboxylic acids. For this purpose, the activation of hydroxyl groups with cyanogen bromide can be used in the first step. Hydrophilic amphoteric ion exchangers may be also prepared by quaternization of amino groups in crosslinked copolymers by means of halogenoalkane acids.

6 Claims, No Drawings

METHOD FOR PREPARATION OF MACROPOROUS AMPHOTERIC ION EXCHANGERS WITH HIGHLY CROSSLINKED HYDROPHILIC POLYMERIC MATRIX

The invention relates to a method for preparation of hydrophilic polymeric gels which contain cationic and anionic functional groups at the same time or dipolar ions in their structure.

The ion-exchanging hydrophilic polymeric gels with a controlled porosity prepared according to the Czechoslovak Patent Applications PV 703–74, PV 704.74 and PV 896.74 contain in their structure either anionic (cation exchangers) or cationic (anion exchangers) functional groups. It has been proved, that these materials exceed the cation and anion exchangers with a cellulose or polydextran matrix, used till the present time, in their physical as well as chemical properties in sorption and chromatography of various biopolymers.

Besides the common cation and anion exchangers, synthetic organic polystyrene-divinylbenzene ion exchangers were prepared some time ago which parallelly contained basic and acidic functional groups in their structure. An acidic component (e.g. acrylic acid) was absorbed on the polystyrene anion exchanger by the ionic exchange and it was, after penetration into the anion-exchanger particle, polymerized into the network of the exchanger, mostly by wedging of its macromolecular chain. Similarly, it was possible to bind basic components into the cation exchanger. Commercial amphoteric ion exchangers are produced by these procedure, e.g. the type Retardion, which found their use above all in the process called ionic retardation. This separation procedure is used both in a laboratory and in a production scale.

The present development of chromatography of biopolymers discovered a great importance of the amphoteric ion exchangers when they have the functional groups bonded to a matrix which allows penetration of macromolecules, e.g. the importance of polydextran (J. Porath, L. Fryklund: Nature 1970, 226. 1169; J. Porath, N. Fornstedt: J. Chromatog. 1970, 51, 479). Advantageous chemical and mechanical properties of hydrophilic hydroxyacrylate and hydroxymethacrylate gels (prepared according to the Czechoslovak Patents no. 148,828 and 150,819), which exceed the polysaccharid derivatives in many respects, makes these synthetic polymeric gels a very suitable carrier for amphoteric or dipolar ionogenous groups.

The preparation of amphoteric hydrophilic ion exchangers consists in the copolymerization of an anionogenous monomer, which is selected from a group of compounds comprising sulfoalkyl acrylates, sulfoalkyl methacrylates, sulfoalkylacrylamides, sulfoalkylmethacrylamides, acrylic and methacrylic acid, with cationogenous monomers, selected from a group of compounds comprising aminoalkylacrylates, aminoalkylmethacrylates, aminoalkylacrylamides and aminoalkylmethacrylamides and their quaternary ammonium salts, together with crosslinking monomers of the acrylate or methacrylate type selected from a group of compounds comprising diacrylates and dimethacrylates, as alkylene diacrylates, alkylene dimethacrylates, oligo- and polyglycol diacrylates, oligo- and polyglycol dimethacrylates, bisacrylamides, bismethacrylamides and divinylbenzene. The crosslinking agents may contain even more than two acryloyl or methcryloyl groups able to copolymerize. The ternary free-radical copolymerization is carried out in the presence of an inert organic solvent, selected from a group comprising organic acids, alcohols, amines or nitriles, in an aqueous dispersion phase.

The copolymerization may be also carried out in such way, that a macroporous cation exchanger is first prepared by the suspension copolymerization of the anionogenous monomer with a higher amount (more than 10 mol.%) of a crosslinking agent so that the polymer after completion of the polymerization contains a certain part of non-reacted acryloyl or methacryloyl double bonds. If a monomer is then added to this cation exchanger, which is selected from a group comprising vinylpyridines, aminoalkyl acrylates, aminoalkyl methacrylates, aminoalkylacrylamides and aminoalkylmethacrylamides and their quarternary ammonium derivatives, the residual double bonds of the fundamental cation exchanger are able to copolymerize with double bonds of this new basic monomer, which has been only adsorbed by the cation exchanger in the previous phase. The graft copolymer resulting in this way has amphoteric properties. If the gel is used which contains besides anion-exchanging groups also a certain part of non-reacted acryloyl or methacryloyl groups, the sorption of the monomer is first carried out, which is selected from a group comprising sulfoalkyl acrylates, sulfoalkyl methacrylates, sulfoalkylacrylamides, sulfoalkylmethacrylamides, acrylic acid and methacrylic acid, and this adsorbed monomer is grafted in the second stage under the free-radical initiation by copolymerization with pendant acryloyl or methycryloyl groups of the anion exchanger.

The preparation of amphoteric ion exchangers by transformation of the non-ionogenous gel is characterized by modification of crosslinked copolymers of acrylate, methacrylate, acrylamide and methacrylamide monomers, which contain hydroxyl groups, in parallel reactions of anionogenous and cationogenous compounds selected from a group comprising halogenoalkylamines, halogenoalkylammonium compounds, epoxyalkylamines and epoxyalkylammonium compounds and a group of halogenoalkene acids. The modification may be also carried out in the way, that the above mentioned crosslinked copolymers containing hydroxyl groups are allowed to react with compounds which contain two or more reactive groups, as phosgene, epichlorohydrine, diepoxides, polyepoxides, diisocyanates and polyisocyanates, and that the remaining reactive groups after the reaction are employed for binding molecules which render anions and cations by dissociation, e.g. for binding diamines and aminoacids or hydroxyacids, or dicarboxylic acids and aminoacids at the same time. The similar effect was achieved by chemical bonding of aminoacids which render dipolar ions by dissociation. Activation with cyanogen bromide is advantageously used for binding of amines and aminoacids to the gel which contains hydroxyl groups.

The amphoteric ion exchanger is also formed, if the quaternization reaction of alkylamine groups bonded to the gel is used for binding the ionogenous molecule of halogenoalkane acid.

The following important requirement is often accounted in the synthesis of the amphoteric gel: The conversely charged groups should be not only in the stoichiomeric equivalence, but they should be stericly oriented in such way to allow their independent rotation in solution and taking up positions in space demarcated by the length of their spacer arms. It is also required, that they can meet one another at one place and form the ionic bond.

The amphoteric ion-exchanging hydrophilic gels are important for development of fine fractionation methods. They separate mixtures of proteins and nucleic acids already by the linear chromatography without excluding the possible application of elution gradient. The results of separations performed on the amphoteric ion exchangers exceeded separations obtained with the common monofunctional ion-exchanging derivatives (j. Porath: Chromatographic Methods in Fractionation of Enzymes in Biotechnology and Bioengineering Symp. No. 3, pp. 145 – 166, 1972). Derivatives of polydextrans Sephadex and Sepharose (Registered Trade Marks) used for this purpose till the present time have substantially lower chemical and mechanical stability in comparison to the hydrophilic derivatives of hydroxyacrylate and hydroxymethacrylate gels. In addition to this, the new ion exchangers prepared according to this invention swell only very little and do not clog the packed columns even at higher through-flow rates. The gels are resistant towards the microbial infection and may be sterilized by boiling if required.

The following examples illustrate the methods for preparation of amphoteric ion exchangers according to this invention, without, however, limiting the objective of the invention. The above given monomers may be also supplemented with other known cation and anion-active monomers, as are for instance salts of ethylenesulfonic acid and styrenesulfonic acid, quaternized aminoalkylstyrenes and the like.

EXAMPLE 1

A copolymer containing 32.0% of 2-hydroxyethyl methacrylate, 24.5% of ethylene dimethacrylate and 43.5% of N,N-diethylaminoethyl methacrylate (1 g) and having the molecular weight exclusion limit 700,000 was dispersed in 5 ml of dimethylformamide, 2.5 g of a partially neutralized chloroacetic acid was added and the mixture was heated under reflux for 10 hours. The gel was filtered off, washed with acetone, methanol and water, 5% NaOH, water and 5% HCl, water, methanol and acetone. The product was dried first in air and then in vacuum and its determined total exchange capacity was 1.5 mequiv/g.

EXAMPLE 2

The same gel as in Example 1 (1 g) was swollen in 10 ml of 30% NaOH. The mixture was cooled in a bath of ice and NaCl and then 5 ml of solution containing 2 g of chloroacetic acid and 2.5 g of NaOH was added. The mixture was thoroughly homogenized by stirring and a reaction vessel was then placed in a bath at 105° C and heated for 7 hours. Then it was cooled, the gel was filtered off, washed with water, methanol, acetone and ether and then dried in air and finally in vacuum. The total exchange capacity of the product was determined.

EXAMPLE 3

A copolymer of diethylene glycol monomethacrylate with ethylene diacrylate (1 g) was swollen in 10 ml of a cooled 40% solution of NaOH. The mixture was well stirred and cooled and 5 ml of a solution containing 1 g of chloroacetic acid, 0.8 g of 2.chloroethyl-N,N-diethylamine and 1.5 g of NaOH was added to it. The mixture was heated to 105° C for 7 hr. The product was washed with hot water, 10% HCl, water, 10% NaOH, water, 10% HCl, water, methanol, acetone and ether. The gel was dried first in air and then in vacuum. The content of nitrogen was determined according to Kjehldal and the total exchange capacity was determined titrimetrically.

EXAMPLE 4

A copolymer of 2-hydroxyethyl methacrylate with ethylene dimethacrylate, having the molecular weight exclusion limit 300,000, was phosgenated by a procedure according to the Czechoslovak Patent Application PV 6008-73 (Czechoslovakian Pat. No. 168,268; British Pat. No. 1,442,246; U.S. Application Ser. No. 551,271) and 2 g of the phosgenated product with the capacity about 2.5 mequiv/g was transferred into a H-form by washing with 20% HCl. The excess of acid was washed out with water. The gel was immersed into 4-vinylpyridine, the excessive monomer was sucked off and washed out by a mixture methanol — water 2:1. The gel was mixed with a minimum volume of a solution consisting of 10 wt.% of azobisisobutyronitrile in a mixture acetone — water 15:1. A vessel with gel was frozen, evacuated and flushed with nitrogen. This procedure was repeated three times more, the ampoule was sealed, placed in a thermostated bath at the temperature 70° C and heated for 10 hours. The vessel was then opened, the gel washed with methanol, a mixture acetone — water 10:1, acetone and ether and dried first in air and then in vacuum. The content of nitrogen was determined by the elemental analysis and according to Kjehldal (1.75% N).

EXAMPLE 5

A copolymer of 2-hydroxyethyl methacrylate with ethylene diacrylate (1 g), having the molecular weight exclusion limit 300,000, was modified by heating with epichlorohydrine in an alkaline medium. The product was dispersed in 5 ml of 40% NaOH and 1.5 g of arginine in 5 ml of 20% NaOH was added to this mixture. The mixture was thoroughly homogenized by stirring and heated to the temperature 65° C for 5 hr. The gel was filtered off, washed with water, methanol, acetone and ether and dried in air and finally in vacuum. A content of nitrogen was determined in the product by the Kjehldal method.

EXAMPLE 6

A copolymer of 2-hydroxyethyl acrylate with methylenebisacrylamide (3 g), having the molecular weight exclusion limit 100,000, was swollen in 20 ml of 10% aqueous solution of $K_2HPO_3$ and pH was adjusted to 12 with KOH. The dispersion of the gel ws cooled to 10° C and stirred for 30 min. Then, 10 ml of 10% water solution of cyanogen bromide ws added at 10° – 15° C, the mixture was stirred for 2 min and 10 ml of 10% aqueous non-buffered solution of arginine was added. The mixture was moderately stirred at the laboratory temperature for 19 hr. The gel was filtered off, washed with water and stirred with 50 ml of 10% HCl for 5 min. Then it was filtered, washed with water, methanol, acetone and ether. The content of arginine bonded to the gel was determined after hydrolysis with 6N HCl in an automatic aminoacid analyzer.

EXAMPLE 7

A copolymer of 2-hydroxyethyl methacrylate with ethylene dimethacrylate (3 g), having the molecular weight exclusion limit 200,000, was swollen in 20 ml of 10% water solution of $K_2HPO_4$ and pH was adjusted to 12 by KOH. The dispersion of the gel was stirred for 30 min, then cooled to 10° C and 1 ml of 10% aqueous solution of cyanogen bromide was added. The dispersion stirred at 10° – 15° C for 10 min. The gel was then rapidly rinsed with cold water and a cooled phosphate buffer solution of pH 6.5, the buffer solution was sucked off and 10 ml of 10% aqueous solution of arginine was added to the gel. The dispersion was stirred for 19 hr and the gel was then washed in the same way as in the preceding example. The content of bonded arginine was determined also in the same way.

EXAMPLE 8

A copolymer of 2-hydroxyethyl methacrylate with ethylene dimethacrylate (2 g), having the molecular weight exclusion limit 200,000, was dispersed in 10 ml of the cooled 40% solution of NaOH and the excessive NaOH solution was sucked off. Diepoxybutane (2.5 g) was added to the gel and the mixture was thoroughly stirred. A 30% water solution of KOH was dropwise added to the mixture under cooling, and the mixture was thoroughly homogenized by stirring after each addition. The mixture ws then heated to 60° C and allowed to react for 2 hours. Then, it was cooled, the excessive hydroxide was removed by suction and a solution of 2 g of arginine in 10 ml of 30% NaOH was added. The mixture was then thoroughly homogenized and heated to 60° C for 4 hours. The gel was then filtered off, washed with water, methanol, acetone, water, hydrochloric acid, water, 5% NaOH, water, 10% HCl, water, methanol, acetone and ether. The product was dried in air and then in vacuum. The nitrogen content was determined according to Kjehldal.

EXAMPLE 9

A copolymer of diethylene glycol monomethacrylate with ethylene diacrylate (1 g), having the molecular weight exclusion limit 100,000, was mixed with 10 ml of 25% benzene solution of hexanethylenediixocyanate. The mixture was stirred without access of moisture at 20° C for 2 hours. The gel was then filtered off, washed with dry dioxan, benzene and acetone and blended with a mixture of 3 ml of pyridine, 7 ml of water and 1 g of L-arginine. The mixture was heated to 50° C for 3 min, then the heating was stopped and the mixture was further stirred for 4 hours. The gel was filtered off, washed with 15% HCl, water, methanol, dioxan and acetone. The amount of the bonded arginine ws determined from the difference in the content of nitrogen before and after the reaction (the difference was 1% N).

EXAMPLE 10

A mixture consisting of 34.8 mol.% of 2-hydroxyethyl methacrylate, 31.8 mol.% of ethylene dimethacrylate, 16.7 mol.% of methacrylic acid and 16.7 mol.% of N,N-diethylaminoethyl methacrylate was copolymerized in an aqueous dispersion medium in the presence of dodecanol and cyclohexanol at 70° C for 13 hr under initiation with azobisisobutyronitrile. After the reaction was completed, the copolymerization mixture was filtered off, washed with ethanol, benzene, ethanol, and water. The exchange capacities of the acidic and basic functional group were determined by a potentiometric titration and were equal amounting to 0.6 mequiv/g.

EXAMPLE 11

A copolymer of 2-hydroxyethyl methacrylate with ethylene dimethacrylate, having the molecular weight exclusion limit 100,000, was mixed with a moderate excess of the tetrahydrofuran solution of butyllithium. The reaction was carried out under stirring and cooling in the nitrogen atmosphere for 30 min and the gel was then washed with dried tetrahydrofuran. A flask was charged with 7 g of this gel and 27 g of butanediepoxide (dried over the molecular sieve Potasit A3) was added. The flask was heated to 70° C for 3 hours under occasional stirring and without access of moisture. The mixture was allowed to stand overnight and then heated to 100° C under a reflux condenser for 10 min. The temperature inside the flask reached 130° C and the mixture was kept at this temperature for 5 min and then cooled. The gel was washed with acetone, ether, acetone, rapidly with cold water and a large excess of acetone, then with ether, chloroform and ether and dried in vacuum. The gel modified in this way with butanediepoxide (0.3 g) was mixed with 0.25 g of taurine dissolved in 1.6 ml of water. The mixture was homogenized, allowed to stand for 1 hour and then heated to 95° C for 4 hours. After the mixture stood at the laboratory temperature for 2 days, the gel was filtered, washed with water, ethanol, acetone and ether and dried. The elemental analysis and the Kjehldal method gave 0.71% S and 0.45% N respectively.

EXAMPLE 12

The gel modified with butanediepoxide according to Example 11 (0.3 g) was mixed with 0.25 g of L-arginine in 1 ml of distilled water. The mixture was homogenized, allowed to stand for 1 hour at the laboratory temperature, then heated to 95° C in a bath for 4 hr and stood again at the laboratory temperature for 2 days. The gel was washed with distilled water, ethanol, acetone and ether and dried. The nitrogen determination according to Kjehldal showed 3.38% N.

EXAMPLE 13

The gel was reacted with $\epsilon$-aminocaproic acid under analogous conditions as in Example 12 (0.3 g of $\epsilon$-aminocaproic acid in 1 ml of water). Found: 0.68% N.

We claim:

1. A method for preparation of hydrophilic macroporous ion exchangers of amphoteric character for isolation and separation of biological materials, comprising the steps of polymerizing a mixture of (a) anionogenous monomers, selected from a group of compounds comprising sulfoalkyl methacrylates, sulfoalkyl acrylates, sulfoalkylacrylamides and sulfoalkylmethacrylamides, (b) cationogenous monomers, selected from a group of compounds comprising aminoalkyl acrylates, aminoalkyl methacrylates, aminoalkylacrylamides and aminoalkylmethacrylamides and their quaternary ammonium compounds, and (c) at least 10 mol % of crosslinking monomers of acrylate or methacrylate type, selected from group of compounds comprising alkylene diacrylates, alkylene dimethacrylates, oligoglycol and polyglycol diacrylates and dimethacrylates, bisacrylamides, bismethacrylamides and divinylbenzene, in the presence of inert organic compounds, selected from a group of alcohols, organic acids, amines and nitriles, in an aqueous dispersion phase.

2. Method as set forth in claim 1, wherein a macroporous hydrophilic cation exchanger is first prepared by polymerizing said anionogenous monomer (a) with more than 10 mol% of said crosslinking monomer (c), and said exchanger is then copolymerized with a basic reacting monomer selected from the group consisting of vinylpyridines, aminoalkyl acrylates, aminoalkyl methacrylates, aminoalkylacrylamides, aminoalkylmethacrylamides and their quaternary ammonium salts.

3. Method as set forth in claim 1, wherein a macroporous hydrophilic anion exchanger is first prepared by polymerizing said cationogenous monomer (b) with more than 10 mol% of said crosslinking monomer (c), and said exchanger is then copolymerized with an acidic reacting monomer selected from the group consisting of sulfoalkyl acrylates, sulfoalkyl methacrylates, sulfoalkylacrylamides and sulfoalkylmethacrylamides.

4. Method for preparation of amphoteric ion exchangers, as set forth in claim 1, wherein crosslinked copolymers of acrylate, methacrylate, acrylamide and methacrylamide monomers which contain hydroxyl groups are modified by reaction with a compound selected from the group consisting of halogenoalkylamines, halogenoalkylammonium compounds and halogenoalkane acids.

5. Method for the preparation of amphoteric ion exchangers, as set forth in claim 1, wherein crosslinked copolymers of acrylate, methacrylate, acrylamide and methacrylamide monomers are reacted with a compound containing two or more reactive groups in the molecule and selected from the group consisting of phosgene, epichlorohydrine, diepoxides, polyepoxides, diisocyanates and polyisocyanates.

6. Method as set forth in claim 5, wherein the gel after being activated by a multifunctional compound is treated with two compounds selected from the group consisting of diamine with aminoacid, diamine with hydroxyacid and dicarboxylic acid with aminoacid.

* * * * *